(12) United States Patent
Gulvin et al.

(10) Patent No.: US 8,450,902 B2
(45) Date of Patent: May 28, 2013

(54) ELECTROSTATIC ACTUATOR DEVICE HAVING MULTIPLE GAP HEIGHTS

(75) Inventors: Peter M. Gulvin, Webster, NY (US); Peter J. Nystrom, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 341 days.

(21) Appl. No.: 11/467,660

(22) Filed: Aug. 28, 2006

(65) Prior Publication Data
US 2008/0048520 A1   Feb. 28, 2008

(51) Int. Cl.
*H02N 1/00* (2006.01)
*H01H 59/00* (2006.01)
*B41J 2/45* (2006.01)

(52) U.S. Cl.
USPC ............ 310/309; 200/181; 335/78; 361/207; 347/54; 347/55

(58) Field of Classification Search
USPC   310/309; 200/181; 335/78; 361/207; 347/54, 347/55
See application file for complete search history.

(56) References Cited

U.S. PATENT DOCUMENTS

| | | | | |
|---|---|---|---|---|
| 4,205,242 | A * | 5/1980 | Micheron et al. | 307/400 |
| 5,452,878 | A * | 9/1995 | Gravesen et al. | 251/129.02 |
| 5,544,001 | A * | 8/1996 | Ichiya et al. | 361/233 |
| 5,629,565 | A * | 5/1997 | Schlaak et al. | 257/780 |
| 5,818,683 | A * | 10/1998 | Fujii | 361/277 |
| 5,941,501 | A * | 8/1999 | Biegelsen et al. | 251/129.01 |
| 6,034,339 | A * | 3/2000 | Pinholt et al. | 200/181 |
| 6,079,813 | A * | 6/2000 | Tuli | 347/54 |
| 6,322,198 | B1 * | 11/2001 | Higashino et al. | 347/54 |
| 6,467,879 | B1 * | 10/2002 | Kubby et al. | 347/54 |
| 6,508,947 | B2 * | 1/2003 | Gulvin et al. | 216/27 |
| 6,572,218 | B2 * | 6/2003 | Gulvin et al. | 347/54 |
| 6,686,820 | B1 * | 2/2004 | Ma et al. | 333/262 |
| 6,753,488 | B2 * | 6/2004 | Ono et al. | 200/181 |
| 6,803,534 | B1 * | 10/2004 | Chen et al. | 200/181 |
| 6,828,888 | B2 * | 12/2004 | Iwata et al. | 335/78 |
| 7,297,571 | B2 * | 11/2007 | Ziaei et al. | 438/106 |
| 7,382,218 | B2 * | 6/2008 | Charvet | 335/78 |

(Continued)

FOREIGN PATENT DOCUMENTS

| | | | |
|---|---|---|---|
| DE | 4422946 | * | 1/1996 |
| FR | 2 848 331 A1 | * | 6/2004 |
| WO | 2004 086617 A1 | * | 10/2004 |

OTHER PUBLICATIONS

Tranlation of DE 44 22 946 A1, "Electrostatic Actuator for a Microvalve", Jan. 4, 1996, Mettner et al.*
Microfabrica Inc., "EFAB Technology", www.memgen.com/efab/, Jul. 24, 2006.

*Primary Examiner* — Tran Nguyen
*Assistant Examiner* — Terrance Kenerly
(74) *Attorney, Agent, or Firm* — MH2 Technology Law Group LLP

(57) ABSTRACT

The present application is directed to novel electrostatic actuators and methods of making the electrostatic actuators. In one embodiment, the electrostatic actuator comprises a substrate, an electrode formed on the substrate and a deflectable member positioned in proximity to the electrode so as to provide a gap between the electrode and the deflectable member. The deflectable member is anchored on the substrate via one or more anchors. The gap comprises at least one first region having a first gap height positioned near the one or more anchors and at least one second region having a second gap height positioned farther from the anchors than the first region. The first gap height is smaller than the second gap height.

13 Claims, 7 Drawing Sheets

U.S. PATENT DOCUMENTS

| | | | |
|---|---|---|---|
| 2002/0096488 A1* | 7/2002 | Gulvin et al. | 216/27 |
| 2002/0097303 A1* | 7/2002 | Gulvin et al. | 347/65 |
| 2003/0146079 A1* | 8/2003 | Goldsmith | 200/181 |
| 2004/0070647 A1* | 4/2004 | Tanaka | 347/54 |
| 2004/0124497 A1* | 7/2004 | Rottenberg et al. | 257/532 |
| 2004/0140733 A1* | 7/2004 | Keller | 310/309 |
| 2005/0285902 A1* | 12/2005 | Gulvin et al. | 347/55 |
| 2006/0181594 A1* | 8/2006 | Fujii et al. | 347/112 |
| 2008/0048520 A1* | 2/2008 | Gulvin et al. | 310/309 |

* cited by examiner

ELECTROSTATIC ACTUATOR DEVICE HAVING MULTIPLE GAP HEIGHTS

DESCRIPTION OF THE DISCLOSURE

1. Field of the Disclosure

The present application is directed to electrostatic actuators and methods of making electrostatic actuators.

2. Background of the Disclosure

Electrostatic actuators are well known for use in a variety of applications, such as in fluid ejectors for ink jet recording or printing devices. Electrostatic actuators often comprise one or more membranes which can be deflected using electrostatic forces.

FIG. 1 illustrates one example of an electrostatically actuated membrane device 10 in a relaxed state. Membrane 10 can comprise a substrate 12, an insulator layer 14, a stationary electrode 16, a gap 18 and a membrane 20. Substrate 12 can be, for example, a silicon wafer. Insulator layer 14 can be, for example, thin film insulators, such as, silicon nitride. Stationary electrode 16 and membrane 20 may comprise, for example, a metal or a doped semiconductor, such as doped polysilicon. Gap 18 often comprises air, but may also include other dielectrics (not shown), such as silicon nitride and/or silicon oxide layers formed over stationary electrode 16.

Membrane 20 may comprise a conductive landing post 22, which often comprises the same material as membrane 20, such as metal or a doped semiconductor. Landing post 22 can aid in reducing problems with stiction, which is a common failure mode in electrostatic actuators, where two surfaces that come into contact become permanently attached by Van der Waals forces. Because landing post 22 reduces the amount of membrane surface area that can come into contact with other surfaces of the device, stiction forces are decreased.

In operation, a voltage potential is applied to the stationary electrode 16, which attracts membrane 20 and causes it to deflect. However, when actuating the electrostatic membrane actuator, high voltages are often required to deflect membrane 20. These actuation voltages can exceed, for example, 100 volts, or in some cases, 200 volts. These high voltages can lead to very high electric fields over the submicron gap, and a variety of failure modes can be created. Such failure modes can include, for example, dielectric breakdown of air, or other dielectrics, in the gap, or charging of the dielectric, which can lead to changes in device performance or device failure. In addition, the high voltage circuitry required to drive such devices is often relatively large, and thus more costly, than if smaller voltages were used.

SUMMARY OF THE DISCLOSURE

In accordance with the disclosure, one embodiment of the present application is directed to an electrostatic actuator. The electrostatic actuator comprises a substrate, an electrode formed on the substrate and a deflectable member positioned in proximity to the electrode so as to provide a gap between the electrode and the deflectable member. The deflectable member is anchored on the substrate via one or more anchors. The gap comprises at least one first region having a first gap height positioned near the one or more anchors and at least one second region having a second gap height positioned farther from the anchors than the first region. The first gap height is smaller than the second gap height.

Another embodiment of the present application is directed to a method for forming an electrostatic actuator. The method comprises providing a substrate; forming an electrode on the substrate; forming a sacrificial layer on the electrode; depositing a deflectable member on the sacrificial layer so that the deflectable member is anchored on the substrate via one or more anchors; and removing at least a portion of the sacrificial layer to form a gap between the electrode and the deflectable member. The gap comprises a first region positioned near the anchors and a second region positioned farther from the anchors than the first region. The gap in the first region is smaller than the gap in the second region.

Another embodiment of the present application is directed to a method for determining the shape of a gap between an electrode and a deflectable member of an electrostatic actuator. The method comprises determining a desired gap distance between the electrode and the deflectable member for achieving a desired electric field when the deflectable member is fully deflected. A non-deflected shape of the deflectable member is determined. The deflectable member having the non-deflected shape is capable of achieving the desired gap distance when the deflectable member is fully deflected.

Additional embodiments and advantages of the disclosure will be set forth in part in the description which follows, and can be learned by practice of the disclosure. The embodiments and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate several embodiments of the disclosure and, together with the description, serve to explain the principles of the disclosure.

DESCRIPTION OF THE EMBODIMENTS

Reference will now be made in detail to various exemplary embodiments of the present application, examples of which are illustrated in the accompanying drawings. Wherever possible, the same reference numbers will be used throughout the drawings to refer to the same or like parts.

Figure 2:
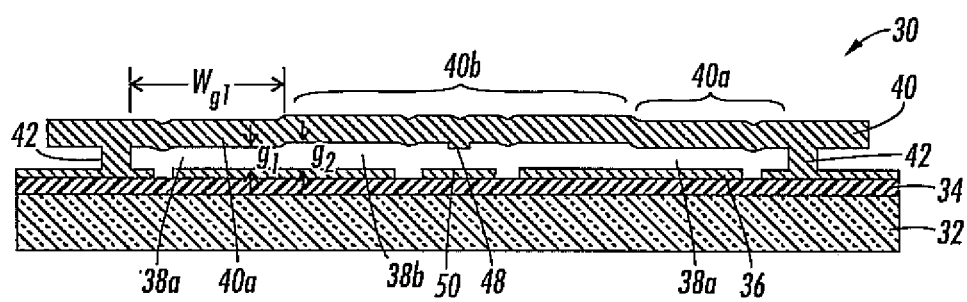
FIG. 2 illustrates an electrostatic actuator device, according to an embodiment of the present application.

FIG. 2 illustrates an electrostatic actuator device 30 according to an embodiment of the present application. Electrostatic actuator device 30 can include a substrate 32, an insulator layer 34, an electrode 36, a gap 38 and a deflectable member 40. Deflectable member 40 can be anchored on substrate 32 via anchors 42. For purposes of this application, the term "on" is defined so as not to require direct physical contact, so that neither deflectable member 40 or anchors 42 need be in direct physical contact with substrate 32. In yet other embodiments, anchors 42 may be in direct physical contact with substrate 32.

Substrate 32 may be any desired material that will provide suitable mechanical support for device 30. Examples of substrates include semiconductor substrates, such as silicon wafers, silicon carbide wafers and gallium arsenide wafers; conductive wafers, such as aluminum substrates; and insulating substrates, such as glass substrates.

Insulator layer 34 may comprise any suitable material with appropriate electrically insulating properties, and which is otherwise compatible for use in electrostatic actuators. Examples of suitable insulator materials include silicon oxide and silicon nitride. Insulator layer 34 may be any suitable thickness that will provide the desired electrical insulation between substrate 32 and electrode 36. For example, Insulator layer 34 may range in thickness from about 10 angstroms to about 10 microns.

Electrode 36 may be formed of any suitable electrically conductive material. Examples of such materials include doped polysilicon or metals, such as aluminum and tantalum. Electrode 36 may be any suitable thickness. For example, electrode 36 may range in thickness from about 10 angstroms to about 10 microns.

In embodiments, gap 38 may be filled with any suitable fluid that allows the desired movement of deflectable member 40. In one embodiment, gap 38 is an air gap, as is well known in the art. Other well known gases, such as nitrogen gas or a higher dielectric strength gas, such as $SF_6$, can be used in place of air. In yet other embodiments, the gap may comprise a vacuum. One or more dielectric layers, such as, for example, one or more silicon nitride and/or silicon oxide layers (not shown) can be positioned in gap 38 between electrode 36 and deflectable member 40.

Deflectable member 40 may be formed of any suitable electrically conductive material. Examples of such materials include doped polysilicon and metals, such as aluminum and nickel, or combinations of these materials. Deflectable member 40 may be any suitable thickness. For example, deflectable member 40 may range in thickness from about 0.1 micron to about 10 microns.

As illustrated in FIG. 2, deflectable member 40 is shaped to have one or more lower regions 40a positioned near anchors 42 to form reduced gap regions 38a. One or more upper regions 40b of deflectable member 40 are positioned further from anchors 42 to form one or more second gap regions 38b. The reduced gap regions 38a have a gap height, $g_1$, between regions 40a and electrodes 36, that is smaller than the height of gap, $g_2$, formed between regions 40b and electrodes 36. The size of $g_1$ and $g_2$ may be chosen to be any suitable size, as will be discussed in greater detail below. Example sizes for $g_1$ may range from about 0.1 um to about 3.0 um, and example sizes for $g_2$ may range from about 0.125 to about 4.0 um. These sizes are example sizes only, and as with other examples throughout this specification, values outside the given ranges may also be chosen.

Reduced gap regions 38a can help reduce the amount of voltage required to deflect deflectable member 40. In a voltage-driven parallel-plate capacitor, the force generated is inversely proportional to the square of the gap between the capacitor plates. Therefore, a slight reduction in gap can make a large impact in the force generated. The relationship between voltage and force is shown in the following formula I.

$$F = \frac{A\varepsilon V^2}{2g^2} \quad \text{I}$$

where F is force generated between the plates;
A is area between the plates;
$\in$ is the dielectric constant of the material between the capacitor plates (e.g., for air, $\in$ is 1);
V is the voltage applied to the plates; and
g is the height of the gap between the plates.

Figure 1:
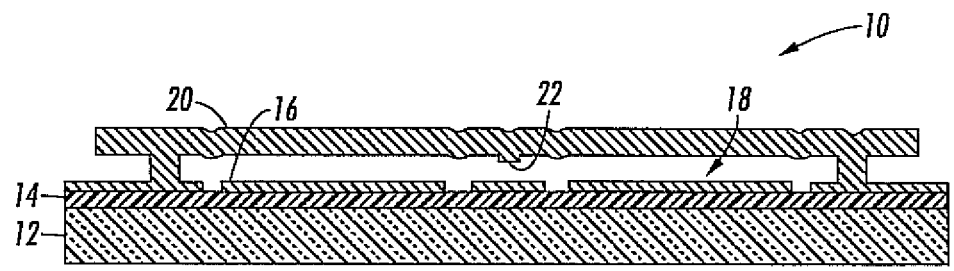
FIG. 1 illustrates one example of an electrostatically actuated membrane device 10 in a relaxed state.

As seen from formula I, reducing the gap will allow a smaller voltage to be applied to generate the same force between the parallel plates. Thus, a smaller voltage may be applied to electrodes 36 of device 30 to provide the force necessary to deflect deflectable member 40, than the voltage required in a similar device without reduced gap regions, such as device 10 of FIG. 1.

Figure 3:
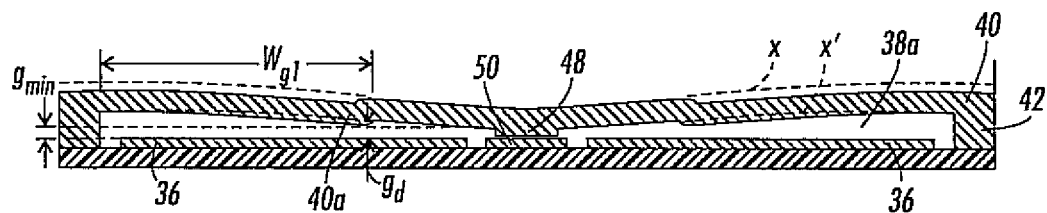
FIG. 3 illustrates a modeled position of a fully deflected deflectable member, according to an embodiment of the present application.

In this embodiment, the shape of gap 38 can be varied by adjusting the dimensions of reduced gap region 38a, including the width of the reduced gap region, $W_{g1}$, as well as the height of the reduced gap, $g_1$. For example, the values for $W_{g1}$ and $g_1$ may be chosen to reduce the voltage necessary to deflect deflectable member 40, while maintaining a gap which is not reduced below a desired distance when deflectable member 40 is deflected. This concept is illustrated in the embodiment of FIG. 3, which shows a dotted line representing a desired minimum gap, $g_{min}$. As shown in FIG. 3, a value for $W_{g1}$ can be chosen so that when deflectable member 40 is fully deflected, the gap, $g_d$, between electrode 36 and deflectable member 40 at the inner most edge of region 40a, is approximately equal to $g_{min}$.

The value for $g_{min}$ may be chosen to be any desired value below which it is not desired to reduce the gap size. In some embodiments, the value may be chosen based on a maximum electric field value chosen for the particular device, taking into account any desired tolerance or safety factors.

The value for $W_{g1}$ can be determined using any suitable technique, such as iterative modeling techniques similar to those discussed below with respect to FIGS. 6A to 6C. In one such technique, an approximate value for $W_{g1}$ is chosen for a given reduced gap height, $g_1$. For example, dashed lines x and x' of FIG. 3 show the modeled position of a fully deflected deflectable member 40 if it were formed without reduced gap regions, similar to, for example, the membrane of device 10 illustrated in FIG. 1. As shown in FIG. 3, the approximate value for $W_{g1}$ can be chosen so that the reduced gap region 38a extends to the point where the gap between x' and electrodes 36 is equal to the minimum gap, $g_{min}$, plus the reduction in gap, where the reduction in gap is the difference between $g_2$ and $g_1$.

Then using the approximate value of $W_{g1}$ as a starting point, deflectable member 40 can be modeled to determine if $g_d$ is actually equal to $g_{min}$ when deflectable member 40 is fully deflected. If $g_d$ is not equal to $g_{min}$, a more suitable second value for $W_{g1}$ can be determined based on the modeling results, and the modeling process can be repeated using the new $W_{g1}$ value. This iterative modeling process may be repeated multiple times until a suitable $W_{g1}$ value is determined. The modeling process may be performed using any suitable modeling software. Suitable modeling software is well known in the art. One example of suitable modeling software is ANSYS MULTIPHYSICS™, which is available from Ansys.

Figure 10:
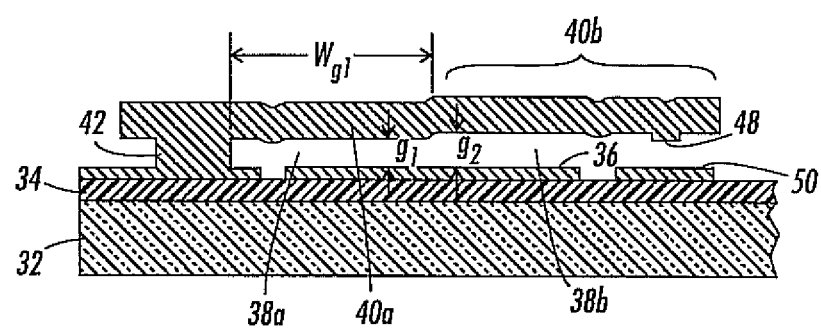
FIG. 10 illustrates a cantilever device, according to an embodiment of the present application.

In the illustrated embodiment of FIG. 2, deflectable member 40 is in the form of a membrane. However, one of ordinary skill in the art would understand that the principles of the present application can apply to other deflectable members known for use in electrostatic actuators, such as, for example a cantilever beam or deformable mirror structure. FIG. 10 illustrates one embodiment of a cantilever device similar to the device of FIG. 2. The deflectable member of the cantilever device is shaped to have one or more lower regions 40a positioned near anchor 42 to form a reduced gap region 38a. One or more upper regions 40b of the deflectable member are positioned further from anchor 42 to form one or more second gap regions 38b. The reduced gap region 38a has a gap height, $g_1$, between region 40a and electrode 36, that is smaller than the height of gap, $g_2$, formed between region 40b and electrode 36.

Figure 4A:
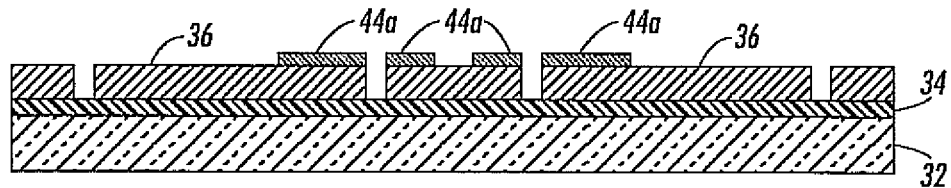
FIGS. 4A to 4C illustrate a process for making the device of FIG. 2, according to an embodiment of the present application.
Figure 4B:
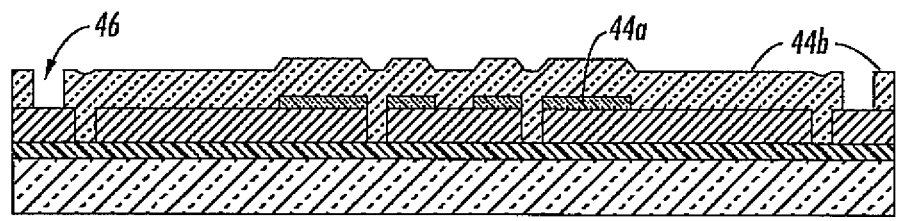
Figure 4C:
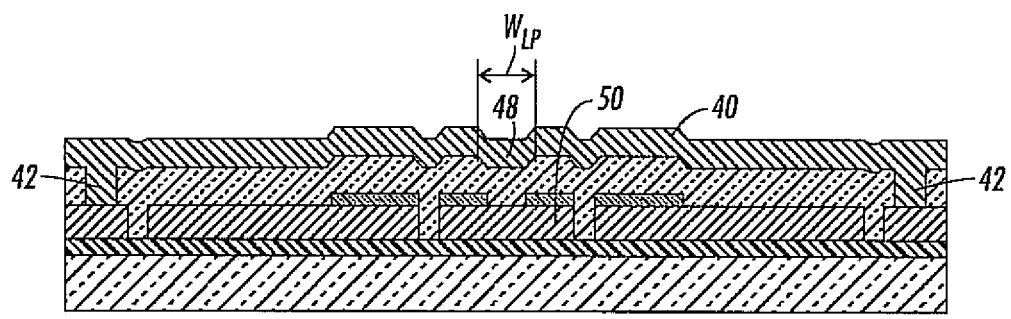

FIGS. 4A to 4C illustrate a process for making device 30 of FIG. 2. The process includes providing a substrate 32, and then forming an electrode 36 on the substrate. In the illustrated process, an insulating layer 34 is deposited between electrode 36 and substrate 32. In certain embodiments, such as where substrate 32 is insulative, insulating layer 34 may be omitted, and electrode 36 may be formed directly on substrate 32.

Insulator 34 may be formed by any suitable method. Examples of suitable methods known in the art include chemical vapor deposition (CVD), plasma enhanced chemical vapor deposition (PECVD), and thermal oxidation and nitridation.

Electrode 36, shown in FIG. 4A, can be formed by any suitable process, such as by coating a conductive layer on insulator layer 34 and etching the conductive layer to form an appropriate electrode pattern. Any suitable coating and etching processes may be employed. In other embodiments, non-etch methods such as LOCOS may also be used to define the electrode pattern in polysilicon, as is well known in the art. In one exemplary embodiment, electrode 36 is a doped polysilicon layer formed by chemical vapor deposition, as is well known in the art. The polysilicon can be patterned using suitable photolithography techniques, and then etched using dry or wet etching processes, as is also well known in the art. In some embodiments, following formation of electrode 36, optional dielectric layers (not shown) can be deposited to cover electrode 36.

As illustrated in FIGS. 4A and 4B, sacrificial layer portions 44a and 44b can be formed. The purpose of sacrificial layers 44a and 44b is to provide a spacer material on which deflectable member 40 can be formed that can be selectively etched away to form gap 38, as illustrated in FIG. 2. In the embodiment of FIG. 4, sacrificial layer 44a is illustrated as being formed only on the top surface of electrode 36 and layer 50. In other embodiments, sacrificial layer 44a may also extend from the top surfaces of electrode 36 and layer 50 onto the adjacent sidewalls of electrode 36 and layer 50, and/or onto the surface of insulating layer 34, so as to at least partially fill the space between electrode 36 and layer 50.

The shape of the sacrificial layer determines the shape of gap 38. For example, in the embodiment illustrated in FIGS. 4A and 4B, sacrificial layer portions 44a and 44b are formed in regions where it is desired to have a larger gap, while only sacrificial layer portion 44b is formed in regions where a smaller gap is desired.

Sacrificial layer 44 can be any suitable material which can be selectively etched away relative to the other layers of the device structure. Examples of such materials include doped oxides, such as phosphosilicate glass (PSG) or borophosphosilicate glass (BPSG), or tetra-ethyl-orthosilicate glass (TEOS) or other suitable materials.

In one embodiment, sacrificial layer 44a can be formed over portions of electrodes 36, and then sacrificial layer portion 44b can be formed on sacrificial layer portion 44a and portions of electrode 36 not covered with sacrificial layer portion 44a, as illustrated in FIG. 4B. Sacrificial layers 44a and 44b can be formed using any suitable technique. For example, suitable deposition and patterning techniques for forming sacrificial layer portions 44a and 44b are well known in the art.

After forming sacrificial layer 44, a deflectable member 40 is deposited. As shown in FIG. 4C, deflectable member 40 conforms to the shape of the upper surface of sacrificial layer 44. Deflectable member 40 can be anchored on the substrate via one or more anchors 42 which are formed in vias 46 formed in sacrificial layer 44. Anchors 42 and vias 46 can be formed by any suitable method. Suitable methods for forming anchors 42 and vias 46 are well known in the art.

Deflectable member 40 can be formed by any suitable method, such as by deposition and patterning methods well known in the art. Suitable deposition methods may include, for example, CVD and PECVD processes. Suitable patterning methods may include, for example, wet and/or dry etch processes. In one embodiment, electrode 36 comprises doped polysilicon formed by a CVD process.

After forming deflectable member 40, sacrificial layer 44 is removed to form gap 38 between electrode 36 and deflectable member 40, as shown in FIG. 2. Sacrificial layer 44 can be removed by any suitable process. Examples of suitable processes for removing sacrificial layer 44 include wet etch, vapor etch, and dry etch techniques, which are well known in the art. One example of a suitable wet etch comprises first using hydrofluoric acid to remove sacrificial layer 441 followed by a deionized water rinse, then an alcohol soak to reduce surface tension, and thereby alleviate stress on electrode 36, as the hydrofluoric acid etchant is removed from gap 38. The device is carefully dried using techniques such as oven bakes, or more sophisticated critical point processes to prevent stiction. These methods are well known to those skilled in the art.

As described above with respect to FIG. 2, gap 38 includes one or more reduced gap regions 38a positioned near anchors 42 where only sacrificial layer portion 44b was deposited, and one or more second regions 38b positioned farther from the anchors where both sacrificial layer portions 44a and 44b were deposited. The gap in reduced gap regions 38a is relatively small compared to the gap in region 38b. In this embodiment, the difference in gap height between regions 38a and 38b is approximately the thickness of sacrificial layer portion 44a.

In some embodiments, a landing post 48 may also be formed as part of deflectable member 40. As illustrated in the embodiment of FIGS. 4A to 4C, landing post 48 can correspond to a region of the sacrificial layer where only sacrificial layer portion 44b was deposited, similar to reduced gap regions 38a. However, landing post 48 differs from reduced gap regions 38a in a number of ways.

For example, when deflectable member 40 is fully deflected, landing post 48 is designed to contact a device layer, such as layer 50 in the embodiment of FIG. 2, that is positioned on the opposite side of gap 38, in order to minimize the surface area contacted by deflectable member 40 and thereby reduce stiction. Reduced gap regions 38a, on the other hand, are positioned so as not to contact the layer on the opposite side of gap 38 when deflectable member 40 is fully deflected, as described above.

In order to reduce the amount of surface contacted, landing post 48 may be formed to have a relatively small width, $W_{LP}$, and a relatively small surface area. For example, $W_{LP}$ may range from about 1 micron to about 20 microns and be only about 10% or less, such as about 1% to about 5% of the total surface area of the deflectable member 40 within gap 38 (excluding the surface area of anchors 42). On the other hand, deflectable member region 40a can have a width, $W_{g1}$, that is wider than $W_{LP}$, and also have surface area that is larger than the surface area of landing post 48. For example, $W_{g1}$ can range from about 2 microns to about 30 microns, or larger, and be about 2% to about 70%, or more, such as about 20% to about 50% of the total surface area of the deflectable member 40 within gap 38 (excluding the surface area of anchors 42). As with all the ranges providing in this application, these values are exemplary only, and values outside of these ranges may be employed. The actual sizes $W_{LP}$ and $W_{g1}$ may depend on the particular configuration of the device, including such things as the shape and size of the gap, membrane thickness, device width, and material properties, and may be properly scaled for devices of different designs.

In some embodiments, one or more additional layers other than those illustrated in FIG. 4 may be used. For example, a silicon nitride layer may be deposited on electrode 36, prior to depositing sacrificial layer 44. The silicon nitride layer can act as an etch stop to protect underlying layers during the sacrificial etch of layer 44, discussed above.

Figure 5A:
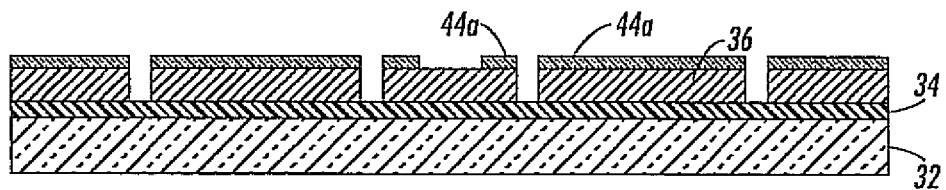
FIGS. 5A to 5D illustrate a process for making a device, according to an embodiment of the present application.
Figure 5B:
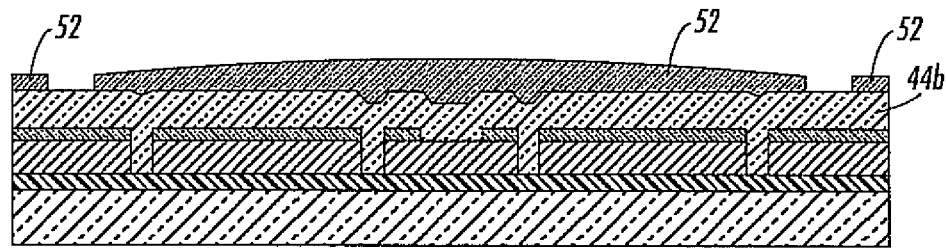
Figure 5C:
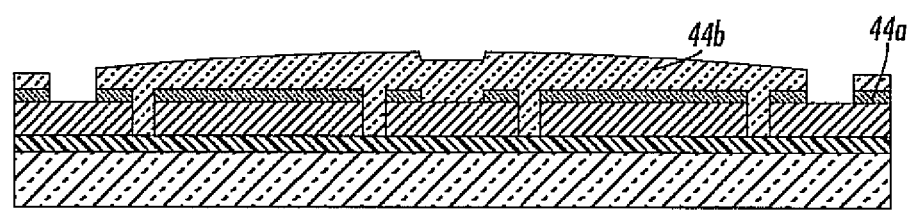
Figure 5D:
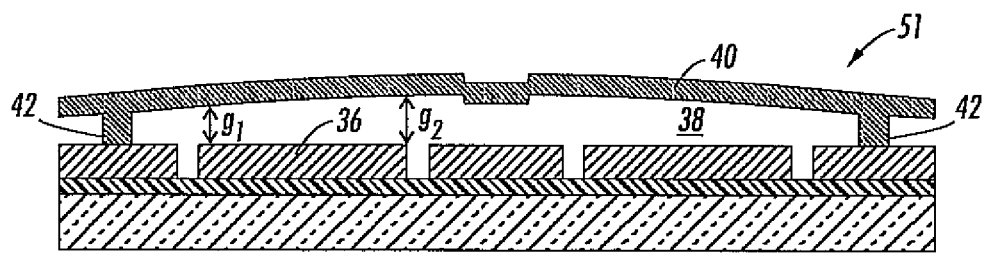

Another embodiment of the present application is illustrated in FIGS. 5A to 5D. The device shown in FIG. 5D is similar to that of FIG. 2, as described above, except that the height of gap 38 in the device of FIG. 5D varies continuously, rather than in discrete steps, as was the case in the device of FIG. 2. In some embodiments, gap height can vary continuously over the majority of gap 38. For example, the gap height may varying continuously between $g_1$ and $g_2$, where $g_1$ and $g_2$ are the height of gap 38 measured at opposite ends of electrode 36, as shown in FIG. 5D.

Varying the gap height continuously, as illustrated in the device of FIG. 5D, can reduce the required operating voltages compared to voltages used in devices where the gap is varied in a stepped manner, since the gap can be reduced to a more optimal height over an increased area of the gap.

The gap height variation can be determined by modeling to determine a shape of the gap that will not touch down on electrodes 36 or create too high of an electric field in any area. The ideal gap shape would provide a gap that, when fully deflected, would produce an electric field of the highest value that is determined to be safe over substantially the entire area of the gap.

Figure 6A:
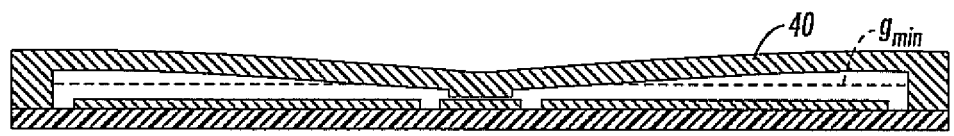
FIGS. 6A to 6C illustrate a process for modeling a deflectable member, according to an embodiment of the present application.
Figure 6B:
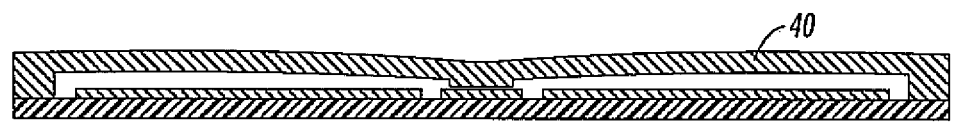
Figure 6C:
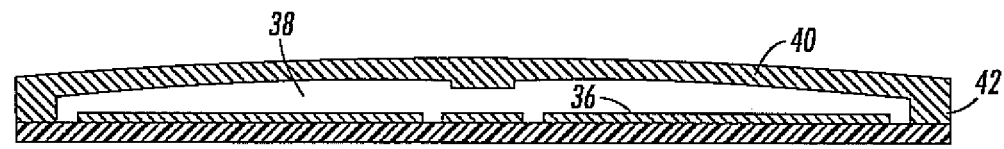

One embodiment of such a modeling process is illustrated in FIGS. 6A to 6C. FIG. 6A represents a deflectable member 40 having a generally uniform gap height, similar to the device of FIG. 1. The dotted line labeled $g_{min}$ represents a desired minimum gap. Deflectable member 40 is modeled in the deflected state with the associates stresses on the deflectable member 40. While in the deflected state, deflectable member 40 is modified, using the modeling software, by shifting the deflectable member 40 so that the gap is at the minimum gap height, $g_{min}$, over substantially the entire area of the gap, as illustrated in FIG. 6B. Then the modified model of deflectable member 40 is allowed to relax, as shown in FIG. 6C, to determine an approximate shape for a deflectable member 40 that will provide the desired minimum gap height, $g_{min}$, when deflected.

Because the forces on the modified deflectable member of FIG. 6C may be different than the forces on the original deflectable member of FIG. 6A, the modified deflectable member may not actually form the exact shape intended to produce the minimum gap, $g_{min}$, when fully deflected, even if the voltage is reduced to appropriate values to account for the modified shape of the deflectable member. Thus, to determine a more "ideal" shape for deflectable member 40, the modeling process may be repeated using the modified deflectable member 40 as the starting point. In this repeat process, deflectable member 40, having the modified shape of FIG. 6C, is deflected as in FIG. 6A, and the gap height is adjusted to $g_{min}$ while maintaining the deflected position, as in FIG. 5B. The newly adjusted deflectable member 40 is then allowed to relax to determine a new modified shape. The process may be repeated iteratively until the shape of the deflected member is considered to be sufficiently optimized.

Referring again to FIGS. 5A to 5D, an embodiment of a process for forming device 51 of FIG. 5D will now be described. Device 51 of FIG. 5D is formed similarly to device 30 of FIG. 2, except for the manner of shaping the sacrificial layer 44, as will be described below. As illustrated in FIG. 5A, an insulator layer 34 and electrode 36 are formed on substrate 32, similarly as described above with respect to FIG. 4A. A sacrificial layer portion 44a is formed, also similarly as described above with respect to FIG. 4A, except that sacrificial layer portion 44a is not patterned to expose portions of electrode 36 to form the reduced gap regions 38a. Instead, sacrificial layer portion 44a remains over the upper surfaces of electrode 36, as shown in FIG. 5a. A sacrificial layer portion 44b is then deposited on sacrificial layer portion 44a, as shown in FIG. 5B, using methods and materials which are the same as those described above for sacrificial layer portion 44b of FIG. 4B.

Sacrificial layer portions 44a and 44b can then be shaped so as to achieve a gap 38 of continuously varying size, such as, for example, a shape determined by the iterative modeling process described above with reference to FIGS. 6A to 6C. Any suitable method known in the art for forming sacrificial layers having a continuously varying thickness may be employed.

The embodiment of FIG. 5B illustrates one example of such a method using grayscale lithography. As is well known in the art, grayscale lithography involves exposing photoresist using a photomask of varying dot pattern densities, where the lower pattern densities allow portions of the photoresist to be more fully exposed than higher pattern densities.

In this embodiment, a photoresist 52 is spun onto sacrificial layer portion 44b. Grayscale lithography techniques are then employed to expose photoresist 52 using, for example, a photomask of varying dot pattern densities to expose the photoresist so that when it is developed, it forms a photoresist of continuously varying thickness, such as shown in FIG. 5B. The developed resist and sacrificial layer 44 can then be etched using an etchant that attacks both the resist and the sacrificial layer 44. During the etch process, the thinner areas of the photoresist give way earlier, so that the etch penetrates farther into the sacrificial layer 44 in those areas. The resulting sacrificial layer portions 44a and 44b, as shown in FIG. 5C, have the desired shape of gap 38, described above.

Other suitable microfabrication techniques for creating nonplanar, three-dimensional shapes may be employed to form a sacrificial layer of continuously varying thickness.

Such techniques may include, for example, EFAB™ Technology, developed by Microfabrica.

Referring to FIG. 5D, deflectable member 40 can then be deposited, similarly as described above in the description of FIG. 4C. Gap 38 can then be formed by removing sacrificial layer portions 44a and 44b, by methods similar to those described above in the description of FIGS. 4C and 4D.

In the embodiments discussed above with respect to FIGS. 2 to 6, the deflectable member is shaped by varying the topography of the sacrificial layer in order to form a gap 38 having a gap height that changes in a single discrete step, as in FIG. 2, or a gap 38 having a continuously varying gap height, as in FIG. 5. These embodiments both result in a gap 38 that includes a first region positioned near the anchors and a second region positioned farther from the anchors, where the gap height in the first region is smaller than the gap height in the second region.

Figure 7:
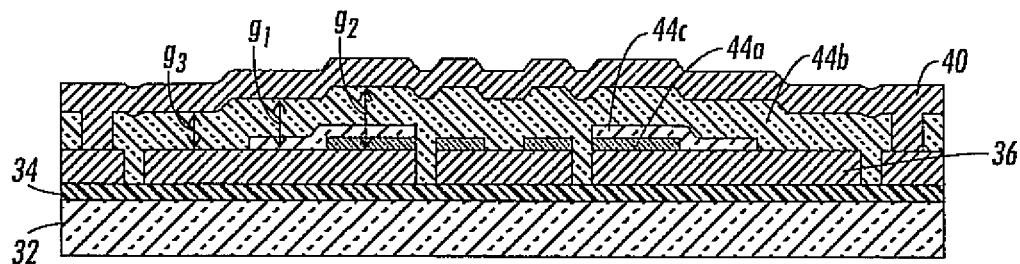
FIG. 7 illustrates an embodiment similar to the embodiment of FIG. 2, except that the thickness of a sacrificial layer is varied to have multiple steps in gap height.

Other embodiments may employ yet other gap shapes to achieve decreased operating voltages. For example, FIG. 7 illustrates an embodiment similar to the embodiment of FIGS. 2 and 4A to 4C, except that the thickness of the sacrificial layer is varied to have multiple steps in gap height. In the embodiment of FIG. 7, sacrificial layer 44 has three regions of varying thicknesses, which will correspond to three gap height regions $g_1$, $g_2$ and $g_3$, once sacrificial layer 44 is removed. The multi-stepped gap may be formed using any suitable method. For example, three separate sacrificial layer portions 44a, 44b and 44c, can be formed over electrode 36, as seen in FIG. 7, in order to create a sacrificial oxide having three thickness regions. This method is similar to that described above for FIG. 4, except that a third sacrificial layer 44c is deposited and patterned over patterned sacrificial layer portion 44a, prior to depositing sacrificial layer portion 44b.

In other embodiments, gaps with more than three discrete steps of differing gap heights may be employed. The more steps in gap height that are employed, the closer the gap shape can resemble the continuously varying shaped gap of FIG. 5, which can result in further decreasing the operating voltages of the device.

Figure 8A:
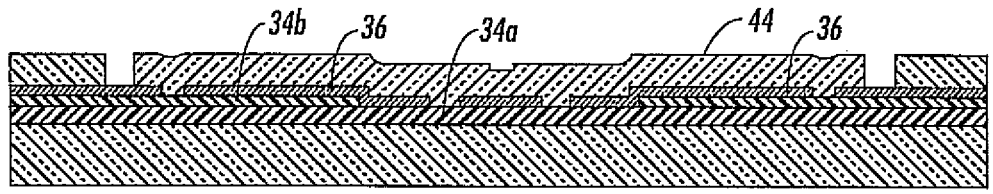
FIGS. 8A to 8C illustrate a process for making a device, according to an embodiment of the present application.
Figure 8B:
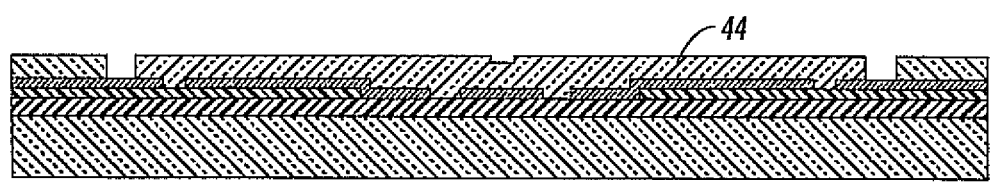
Figure 8C:
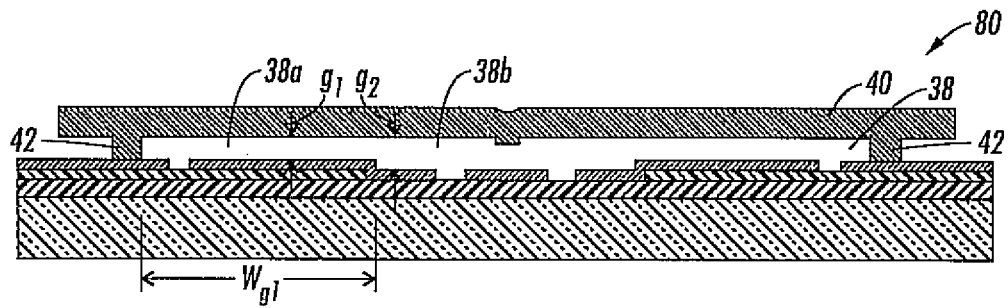

In yet other embodiments, rather than varying the topography of the sacrificial layer, the topography of the layers underlying the sacrificial layer can be varied to provide the desired gap shape. One such embodiment is shown in FIGS. 8A to 8C. As illustrated in FIG. 8A, insulating layer 34 is deposited and then patterned to have a lower region 34a and an upper region 34b in order to provide the desired variation in topography. In one embodiment, this may be accomplished by depositing insulating layer 34 to include multiple layers having differing etch rates. For example, lower region 34a can be formed to include a silicon nitride layer. Upper region 34b can be formed by depositing a silicon oxide layer on the silicon nitride layer, and then removing a portion of the silicon oxide layer by etching techniques, using the underlying nitride as an etch stop. In other embodiments, an insulating layer 34 may comprise a single material, such as silicon nitride or silicon oxide, and a timed etch may be used to etch the desired lower region 34a.

Electrodes 36 are then formed so that a portion of electrodes 36 are positioned on lower region 34a, and the remaining portion of electrodes 36 are positioned on upper region 34b, as illustrated in FIG. 8A. A sacrificial layer 44 is then deposited. In the illustrated embodiment, the sacrificial layer 44 conforms to the topography of the electrodes 36 and insulating layer 34, so that the sacrificial layer has approximately a uniform thickness over the entire surface.

A planarization process can be carried out to planarize the surface of sacrificial layer 44, in order to provide the desired variation in thickness of sacrificial layer 44. The planarization process may be carried out by any suitable process. Suitable processes include chemical mechanical polishing (CMP) and etchback processes. One or more polish stops, such as silicon nitride polish stops (not shown), may be employed at the desired polish depth. The polish stops act to greatly reduce the rate of CMP when the polish of sacrificial layer 44 reaches the desired depth. Suitable CMP processes, including the use of polish stops, are generally well known in the art.

Another suitable planarizing process is a sacrificial etchback, which can involve deposition of a planarizing layer, and then simultaneously etching back the planarizing layer and sacrificial layer 44 to planarize the surface of sacrificial layer 44. Suitable etchback processes are also well known in the art.

The resulting sacrificial layer 44 is shown in FIG. 8B. As shown, the relatively planar surface of sacrificial layer 44 results in a sacrificial layer thickness which is relatively thin over upper regions 34b and thicker over lower regions 34a. After forming sacrificial layer 44, deflectable member 40 can be deposited, and the sacrificial layer 44 can be removed to form gap 38, as shown in FIG. 8C. Any of the methods discussed above for depositing deflectable members and removing sacrificial layers can be employed in this process. In this manner, a device 80 is formed having a gap 38 comprising a first region 38a positioned near the anchors 42 and a second region 38b positioned farther from the anchors, the gap height, $g_1$, of region 38a being smaller than the gap height, $g_2$, of region 38b. Gap 38 may be formed to have any suitable dimensions, such as the same gap heights, $g_1$ and $g_2$, and width dimensions, $W_{g1}$, described above in the embodiment of FIG. 2.

In some embodiments, planarizing sacrificial insulating layer 44 can provide certain benefits, in addition to forming a gap 38 of the desired shape, since the planarization can reduce or eliminate bumps in the membrane that lead to higher electric field areas in the air gap. These high electric field areas are known to cause undesirable effects, such as dielectric breakdown of the gap. Removing the bumps can reduce the electric fields and thereby lead to a reduction in problems associated with the electric fields.

In other embodiments, the device of FIG. 8C may be formed using a sacrificial layer that is varied to have multiple steps in gap height, so as to form a gap 38 having more than two different gap heights. In one such embodiment, sacrificial layer 44 may have a third region having a gap, $g_3$, (not shown) in addition to regions having gaps $g_1$ and $g_2$, shown in the FIG. 8C embodiment. The multi-stepped gap may be formed using any suitable method, such as, for example, using an insulating layer 34 that incorporates three or more separate layers of differing etch rates, and then patterning the layers to form an underlying topography on which electrodes 36 can be formed to achieve the desired gap height. The more steps in gap height that are employed, the closer the gap may be formed to resemble a continuously varying shaped gap, and the more the operating voltages of the device may be decreased, similarly as discussed above in the description of FIG. 7.

In other embodiments, the topography of the underlying layers, such as electrodes and/or the insulating layers the electrodes are formed on, can be varied continuously to provide the desired gap shape. One such embodiment is shown in FIGS. 9A to 9D. The embodiment of FIGS. 9A to 9D is similar to the embodiment of FIGS. 8A to 8C, as described above, except that insulating layer 34 is formed so as to have a continuously varying thickness.

The continuously varying shape of insulating layer 34 may be formed using any suitable methods known in the art. For example, one suitable method may involve depositing a photoresist layer, 52, and then exposing the photoresist 52 using grayscale lithography methods to form the desired shape, similarly as described above with respect to FIG. 5B. The structure of FIG. 9A can then be etched using an etchant that attacks both photoresist 52 and insulating layer 34, to form the structure of FIG. 9B, having an insulating layer 34 with a concave surface of continuously varying thickness. Electrodes 36 can then be formed on the concave surface of insulating layer 34.

Figure 9A:
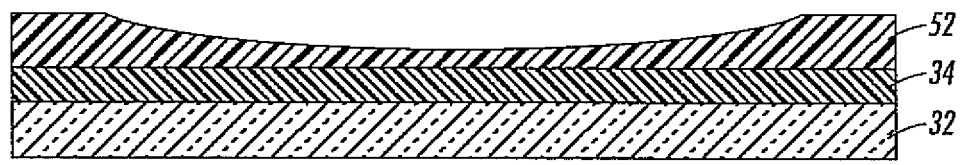
FIGS. 9A to 9D illustrate another process for making a device, according to an embodiment of the present application.
Figure 9B:
Figure 9C:
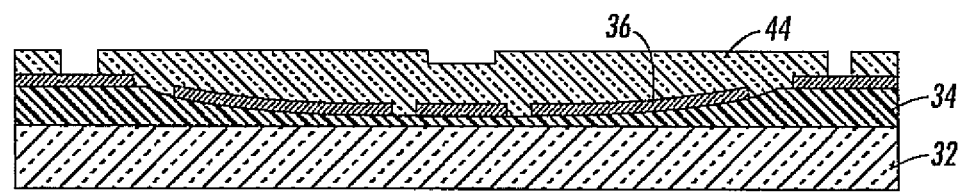
Figure 9D:
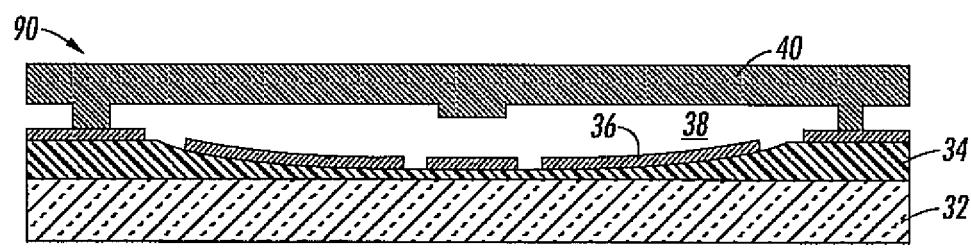

As illustrated in FIG. 9C, a relatively planar sacrificial layer 44 may then be formed, using any of the methods described above for the embodiment of FIGS. 8A and 8B. A deflectable member 40 can then be deposited and the sacrificial layer 44 can be removed using any of the methods discussed above for depositing deflectable members and removing sacrificial layers. In this manner, the device 90 of FIG. 9D is formed having a gap 38 that comprises regions positioned near the anchors 42 having relatively small gap heights, and regions positioned farther from the anchors having larger gap heights than those near the anchors.

The shapes of the gaps for the embodiments of FIGS. 8 and 9 may be determined using the principles and methods discussed above to provide gap shapes that can result in reduced operating voltages. For example, iterative modeling techniques similar to those described herein above may be employed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "an acid" includes two or more different acids. As used herein, the term "include" and its grammatical variants are intended to be non-limiting, such that recitation of items in a list is not to the exclusion of other like items that can be substituted or added to the listed items.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. An electrostatic actuator operable to eject fluid from a fluid ejector for ink let recording or printing device, the electrostatic actuator comprising:
   a substrate;
   an electrode having a flat surface portion and a device layer having a flat conductive surface portion formed on the substrate; and
   a deflectable conductive membrane having discontinuous surface positioned in proximity to the flat surface portion of the electrode and the flat surface portion of the device layer so as to provide a gap between the electrode and the deflectable membrane and between the device layer and the deflectable membrane, the deflectable membrane being anchored on the substrate via at least two anchors and having a conductive landing post about midway between the at least two anchors that contacts the flat conductive surface portion of the device layer when the deflectable membrane is fully deflected, wherein the gap comprises at least one first region having a first gap height positioned near the one or more anchors and at least one second region having a second gap height positioned farther from the anchors than the first region, the first gap height being smaller than the second gap height, the first gap height and the second gap height being provided by the discontinuous surface of the deflectable membrane, with the flat surface portion of the electrode extending from a first location of the first gap to a second location of the second gap, wherein the first gap height, the second gap height, or both are sized to reduce a voltage required to cause the conductive landing post of the deflectable conductive membrane to make contact with the device layer, wherein the size of the gap in the first region ranges from about 0.1 um to about 3.0 um, and the size of the gap in the second region ranges from about 0.125 to about 4.0 um,
   wherein the deflectable conductive membrane is arranged to be substantially planar when not deflected and wherein the electrostatic actuator is operable to eject fluid from a fluid ejector for ink jet recording or printing device.

2. The electrostatic actuator of claim 1, wherein the dimensions of the gap are chosen so as to maintain a gap which is not reduced below a desired distance when the deflectable membrane is deflected.

3. The electrostatic actuator of claim 1, wherein at least one insulator chosen from silicon oxide and silicon nitride is positioned within the gap.

4. The electrostatic actuator of claim 1, wherein the deflectable membrane comprises at least one conductor chosen from polysilicon and metals.

5. The electrostatic actuator of claim 1, wherein the landing post that contacts the device layer is formed as part of the deflectable membrane and therefore is the same material as the deflectable membrane.

6. The electrostatic actuator of claim 1, wherein the gap comprises a fluid dielectric material including nitrogen gas and $SF_6$.

7. The electrostatic actuator of claim 1, further comprising a third region having a third gap height between the electrode and the deflectable membrane, wherein the third gap height is different from both the first gap height and the second gap height.

8. An electrostatic actuator operable to eject fluid from a fluid ejector for ink jet recording or printing device, the electrostatic actuator comprising:
   a substrate;
   an electrode and a device layer formed on the substrate; and
   a deflectable conductive membrane having a concave-shaped surface relative to the electrode and the device layer when not deflected and positioned in proximity to the electrode and the device layer so as to provide a gap between the electrode and the deflectable membrane and between the device layer and the deflectable membrane, the deflectable membrane being anchored on the substrate via at least two anchors and having a landing post about midway between the at least two anchors that contacts the device layer when the deflectable membrane is fully deflected, wherein:

the gap comprises at least one first region having a first gap height positioned near the one or more anchors and at least one second region having a second gap height positioned farther from the anchors than the first region, the first gap height being smaller than the second gap height, and the gap continuously varying in size between the first gap height and the second gap height, wherein the first gap height is sized to reduce a voltage required to cause the landing post of the deflectable conductive membrane to make contact with the device layer, wherein the landing post contacts the device layer at an electrically conductive position when the deflectable membrane is full deflected and wherein the electrostatic actuator is operable to eject fluid from a fluid ejector for ink jet recording or printing device.

9. The electrostatic actuator of claim 8, wherein the landing post that contacts the device layer is formed as part of the deflectable membrane and therefore is the same material layer as the deflectable membrane, the electrode and the device layer comprise a concave structure relative to the substantially planar conductive and deflectable member.

10. The electrostatic actuator of clim 8, wherein the gap comprises a fluid dielectric material including nitrogen gas and $SF_6$.

11. An electrostatic actuator operable to eject fluid from a fluid ejector for ink let recording or printing device, the electrostatic actuator comprising:

a substrate;

an electrode and a device layer formed on the substrate, wherein the electrode and the device layer comprise a concave structure relative to the substantially planar conductive and deflectable member; and a substantially planar conductive and deflectable member, wherein the planar conductive and deflectable member comprises the conductive surface arranged in proximity to the electrode and the device layer so as to provide a gap between the electrode and the deflectable membrane and between the device layer and the deflectable membrane, the deflectable membrane being anchored on the substrate by a first anchor and a second anchor near the lower region and having a landing post near the raised central region about midway between the first and the second anchors that is arranged to contact the device layer when the deflectable membrane is deflected by an applied voltage, wherein:

the gap comprises a first region having a first gap height positioned near the first and the second anchors and a second region having a second gap height positioned near the landing post, the first gap height being smaller than the second gap height, and wherein the electrostatic actuator is operable to eject fluid from a fluid ejector for ink jet recording or printing device.

12. The electrostatic actuator of claim 11, wherein the landing post contacts the device layer at an electrically conductive position when the deflectable membrane is fully deflected.

13. The electrostatic actuator of claim 11, wherein the gap comprises a fluid dielectric material including nitrogen gas and $SF_6$.

* * * * *